United States Patent
Imada et al.

(10) Patent No.: US 12,174,413 B2
(45) Date of Patent: Dec. 24, 2024

(54) LONG PERIOD FIBER GRATING AND OPTICAL TRANSMISSION SYSTEM

(71) Applicant: NIPPON TELEGRAPH AND TELEPHONE CORPORATION, Tokyo (JP)

(72) Inventors: Ryota Imada, Musashino (JP); Yoko Yamashita, Musashino (JP); Takashi Matsui, Musashino (JP); Taiji Sakamoto, Musashino (JP); Nobutomo Hanzawa, Musashino (JP); Noriyuki Araki, Musashino (JP); Shinichi Aozasa, Musashino (JP); Yuto Sagae, Musashino (JP); Kazuhide Nakajima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 119 days.

(21) Appl. No.: 18/024,559

(22) PCT Filed: Sep. 9, 2020

(86) PCT No.: PCT/JP2020/034196
§ 371 (c)(1),
(2) Date: Mar. 3, 2023

(87) PCT Pub. No.: WO2022/054182
PCT Pub. Date: Mar. 17, 2022

(65) Prior Publication Data
US 2023/0324604 A1    Oct. 12, 2023

(51) Int. Cl.
*G02B 6/02*    (2006.01)

(52) U.S. Cl.
CPC ................... *G02B 6/02095* (2013.01)

(58) Field of Classification Search
CPC .................................................. G02B 6/02095
See application file for complete search history.

(56) References Cited

U.S. PATENT DOCUMENTS

| 7,376,307 B2* | 5/2008 | Singh | G02B 6/02095 |
| | | | 385/37 |
| 7,587,110 B2* | 9/2009 | Singh | G02B 6/02309 |
| | | | 385/39 |
| 2006/0008208 A1* | 1/2006 | Gaylord | G02B 6/02142 |
| | | | 385/37 |

FOREIGN PATENT DOCUMENTS

JP    2019-32440 A    2/2019

* cited by examiner

*Primary Examiner* — Sung H Pak

(57) ABSTRACT

Provided are an LPFG and an optical transmission system in which a mode conversion amount does not depend on a polarization state and an electric field distribution. The LPFG according to the present invention includes cavity rows (25-1 and 25-2) of cavities 15 periodically arranged in a core region 11 of the few-mode fiber 10 at a position away from a central axis z of the core region 11 in parallel with the central axis z. Each of the cavity rows (25-1 and 25-2) is located at a different position in a longitudinal direction of the few-mode fiber 10 (where the position in a z direction is different), and the cavity rows (25-1 and 25-2) are located at positions shifted by 90° on a cross section of the core region 11 with the center of the cross section of the core region 11 (the intersection of an x-axis and a y-axis) as an origin.

4 Claims, 5 Drawing Sheets

Fig. 4

| | LP Mode | X POLARIZATION | | | Y POLARIZATION | | |
|---|---|---|---|---|---|---|---|
| | | 01 | 11a | 11b | 01 | 11a | 11b |
| X POLARIZATION | 01 | 0.875584 | 0.051604 | 0.053484 | 4.60E-09 | 1.22E-09 | 1.22E-09 |
| | 11a | 1.89E-06 | 0.501616 | 0.494868 | 2.08E-05 | 6.23E-07 | 6.22E-07 |
| | 11b | 0.044885 | 0.332427 | 0.338657 | 2.18E-10 | 3.87E-11 | 3.90E-11 |
| Y POLARIZATION | 01 | 6.84E-09 | 9.34E-06 | 1.01E-05 | 0.875135 | 0.053533 | 0.052432 |
| | 11a | 5.29E-10 | 2.57E-10 | 6.55E-10 | 6.46E-07 | 0.496753 | 0.500186 |
| | 11b | 1.35E-09 | 3.72E-07 | 3.39E-07 | 0.045529 | 0.336623 | 0.333982 |

LONG PERIOD FIBER GRATING AND OPTICAL TRANSMISSION SYSTEM

CROSS-REFERENCE TO RELATED APPLICATIONS

This application is a 371 U.S. National Phase of International Application No. PCT/JP2020/034196, filed on Sep. 9, 2020. The entire disclosure of the above application is incorporated herein by reference.

TECHNICAL FIELD

The present disclosure relates to a long period fiber grating capable of coupling a plurality of propagation modes, and an optical transmission system including the same.

BACKGROUND ART

FIG. 1 is a diagram illustrating an optical transmission system for mode multiplex transmission using a few-mode fiber (FMF) using a plurality of propagation modes. Mode multiplex transmission has been attracting attention in large capacity transmission systems because it increases the transmission capacity to several times the number of modes. In transmission using FMF, crosstalk between modes occurs in the transmission line, and a multiple-input multiple-output (MIMO) equalizer is used to compensate for the crosstalk.

However, when there is a loss difference between modes (mode dependent loss (MDL)), even if a MIMO equalizer is used, the performance deterioration of the transmission system becomes a problem. In addition, when a group delay difference between modes (differential mode delay (DMD)) is large at the receiving end, a load of digital signal processing (DSP) relating to MIMO becomes large, and thus the reduction of the load to realize long-distance transmission becomes a problem. Therefore, in order to reduce the influence of MDL and DMD, it has been proposed to use a mode scrambler that causes coupling between modes by a long period fiber grating (LPFG) (see, for example, PTL 1).

CITATION LIST

Patent Literature

[PTL 1] Japanese Patent Application Laid-open No. 2019-32440

SUMMARY OF INVENTION

Technical Problem

As a method of realizing the LPFG, there are a method of applying stress and bending from the outside, a method of laser irradiation, and the like. In these methods, the refractive index change can be given only in one direction in the cross section of the optical fiber, and the LPFG has a problem that a mode conversion amount depends on a polarization state or an electric field distribution of a propagation mode, and it is difficult to avoid the dependence of the mode conversion amount.

Therefore, in order to solve the above problems, it is an object of the present invention to provide an LPFG and an optical transmission system in which a mode conversion amount does not depend on a polarization state or an electric field distribution.

Solution to Problem

In order to achieve the above object, the LPFG of the present invention forms a periodic cavity at a position shifted from the central axis of an optical fiber.

Specifically, the LPFG according to the present invention is a long period fiber grating formed on a few-mode fiber capable of propagating n (n is an integer of 2 or more) propagation modes, the LPFG including:
cavity rows periodically arranged in a core region of the few-mode fiber at a position away from a central axis of the core region in parallel with the central axis, in which a plurality of the cavity rows are provided,
each of the cavity rows is located at a different position in a longitudinal direction of the few-mode fiber, and
the cavity rows are located at positions shifted by 90° from each other on a cross section of the core region with a center of the cross section of the core region as an origin.

Further, an optical transmission system according to the present invention includes:
a multi-mode fiber capable of propagating n (n is an integer of 2 or more) propagation modes; and
the few-mode fiber that is connected to the multi-mode fiber and is formed with the long period fiber grating.

Since the arrangement of the cavity rows is shifted by 90°, mode conversion that does not depend on the polarization state or the electric field distribution is possible. Accordingly, the present invention can provide an LPFG and an optical transmission system in which a mode conversion amount does not depend on a polarization state and an electric field distribution.

Further, it is preferable that the cavity rows of the LPFG according to the present invention have the same cavity interval and the same number of cavities.

Furthermore, in the LPFG according to the present invention, it is preferable that the number of the propagation modes of the few-mode fiber be 3,
the cavity row be located at a position where a ratio to a radius of the core region is 0.2 or more and 0.4 or less on the cross section with the center of the cross section of the core region as the origin, and
a diameter of each cavity constituting the cavity row have a ratio of 0.3 or more and 0.43 or less with respect to the radius of the core region.

The above inventions can be combined as much as possible.

Advantageous Effects of Invention

The present invention can provide an LPFG and an optical transmission system in which a mode conversion amount does not depend on a polarization state and an electric field distribution.

BRIEF DESCRIPTION OF DRAWINGS

FIG. 4 is a diagram illustrating an effect of the LPFG according to the present invention.

DESCRIPTION OF EMBODIMENTS

Figure 1:
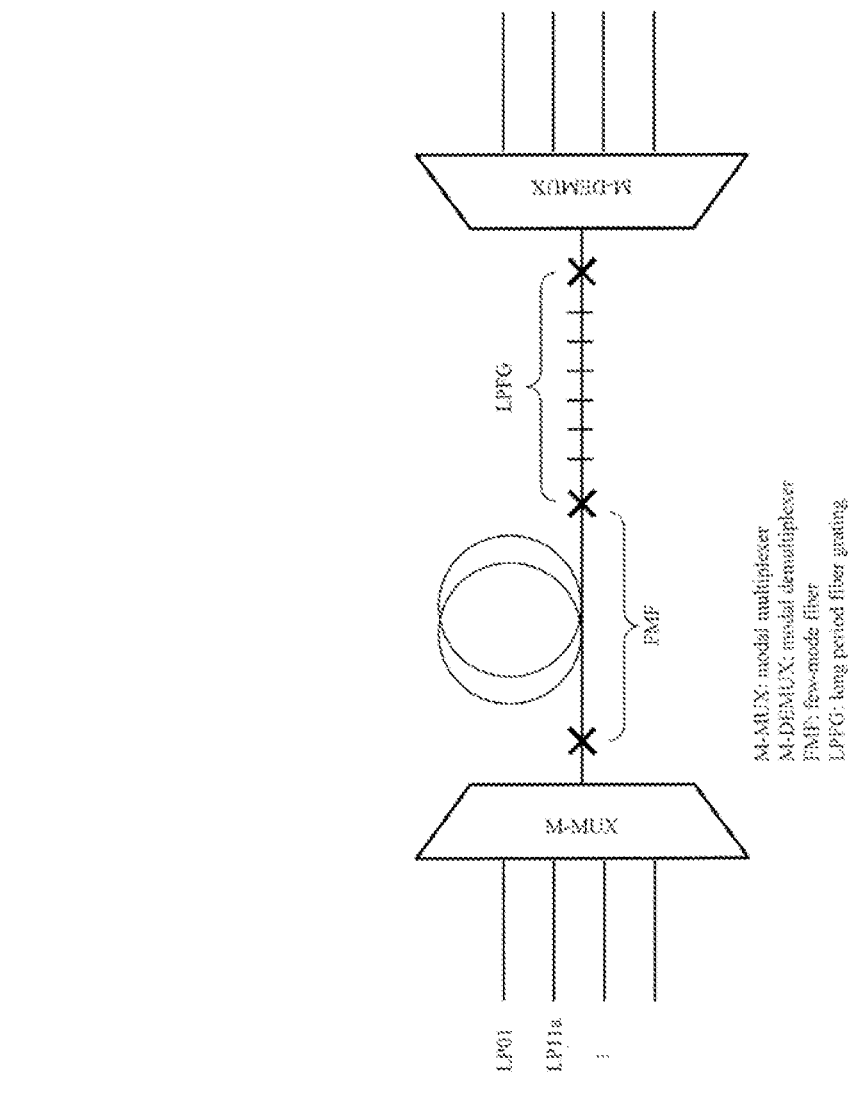
FIG. 1 is a diagram illustrating an optical transmission system in which coupling between modes is performed.

Embodiments of the present invention will be described with reference to the accompanying drawings. The embodiments described below are examples of the present invention, and the present invention is not limited to the following embodiments. Note that, in the present specification and the drawings, the components having the same reference numerals indicate the same components.

Embodiment 1

Figure 2:
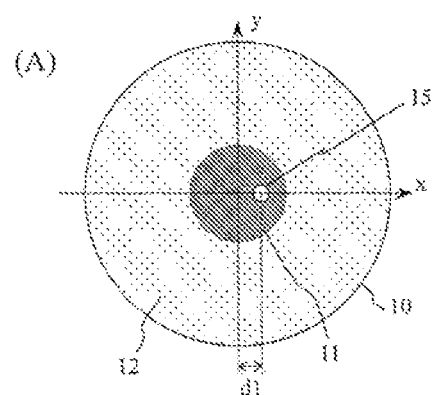
FIG. 2 is a diagram illustrating an LPFG according to the present invention.
Figure 2:
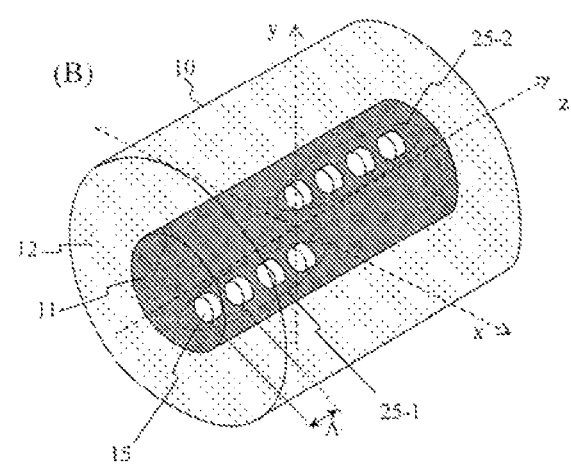

FIG. 2 is a diagram illustrating an LPFG according to the present embodiment. The LPFG is a long period fiber grating formed on a few-mode fiber 10 capable of propagating n (n is an integer of 2 or more) propagation modes. Also, the LPFG includes cavity rows (25-1 and 25-2) of cavities 15 periodically arranged in a core region 11 of the few-mode fiber 10 at a position away from a central axis z of the core region 11 in parallel with the central axis z. Each of the cavity rows (25-1 and 25-2) is located at a different position in a longitudinal direction of the few-mode fiber 10 (where the position in a z direction is different), and the cavity rows (25-1 and 25-2) are located at positions shifted by 90° on a cross section of the core region 11 with the center of the cross section of the core region 11 (the intersection of an x-axis and a y-axis) as an origin.

FIG. 2(A) is a cross-sectional view of the few-mode fiber 10.

FIG. 2(B) is a perspective view of the few-mode fiber 10. Reference numeral 12 denotes a cladding region.

An object of the LPFG is to realize mode conversion that does not depend on the polarization or the electric field distribution by periodically arranging the cavities 15 in a propagation direction in the few-mode fiber 10. In order to achieve this object, the cavities 15 are periodically arranged inside the core region 11 of the few-mode fiber 10 by external processing using a femtosecond laser. A row in which a plurality of cavities 15 are periodically arranged is called a cavity row. In the cavity row 25-1, the center coordinate of the cavity 15 is on the x-axis (y-coordinate is zero), and in the cavity row 25-2, the center coordinate of the cavity 15 is on the y-axis (x-coordinate is zero). The cavity row 25-1 and the cavity row 25-2 are connected in series. In other words, mode conversion that does not depend on the polarization state or the electric field distribution can be realized by shifting the cavity rows by 90° about a z-axis and arranging them.

Here, an interval A in the z-axis direction of the cavity 15 is given the following equation, where the propagation constant difference between the coupled propagation modes is Δβ.

[Math. 1]
$$\Lambda = \frac{2\pi}{\Delta\beta} \quad (1)$$

Therefore, it is possible to create an LPFG (as shown in FIG. 2, in which the two cavity rows are shifted by 90° about the z-axis) for adjusting A to couple the two desired modes. Then, by connecting a plurality of LPFGs having different A to each other, it is possible to couple the plurality of modes.

Therefore, the LPFG of the present embodiment can realize mode conversion that does not depend on the polarization state or the electric field distribution. However, it is necessary to satisfy the following requirements.

(A) The cavity interval A of the cavity row 25-1 and the cavity interval A of the cavity row 25-2 are equal to each other. This is for coupling the desired modes.

(B) The number of cavities of the cavity row 25-1 and the number of cavities of the cavity row 25-2 are equal to each other. This is to eliminate the deviation of the coupling amount between the polarizations.

(C) There is no order relationship between the cavity row 25-1 and the cavity row 25-2 arranged in the z-axis direction.

(D) The cavity row 25-1 and the cavity row 25-2 do not necessarily have to be arranged consecutively.

Embodiment 2

Figure 3:
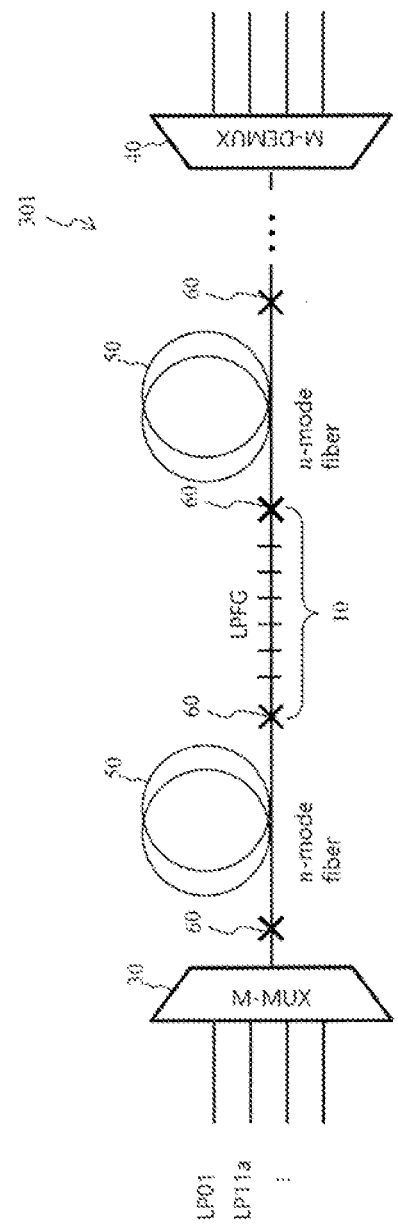
FIG. 3 is a diagram illustrating an optical transmission system according to the present invention.

FIG. 3 is a diagram illustrating an optical transmission system 301 of the present embodiment. The optical transmission system 301 includes a multi-mode fiber 50 capable of propagating n (n is an integer of 2 or more) propagation modes, and the few-mode fiber 10 that is connected to the multi-mode fiber 50 and is formed with the LPFG described in Embodiment 1. Reference numeral 30 denotes a modal multiplexer for entering a plurality of optical signals into any propagation mode in which the multi-mode fiber 50 propagates. Reference numeral 40 denotes a modal demultiplexer for demultiplexing a plurality of modes propagated by the multi-mode fiber 50. Reference numeral 60 denotes a connecting portion.

The optical transmission system 301 is a mode multiplex transmission system using the multi-mode fiber 50 through which n modes propagate as a transmission line. In the optical transmission system 301, a plurality of few-mode fibers 10 having an appropriate LPFG for coupling two desired modes are connected in the middle of a transmission line. As described above, since the interval A between the cavities of the LPFG is given by Equation 1, a plurality of LPFGs having A for coupling the two desired modes can be inserted into the transmission line, thereby coupling the plurality of modes as a whole of the optical transmission system 301. Further, by inserting a plurality of LPFGs into the intermediate portion of the transmission line, the effect of reducing MDL and DMD can be further enhanced.

Embodiment 3

In the present embodiment, the effect of the cavity 15 formed in the core region 11 of the few-mode fiber 10 will be described. In the present embodiment, an example will be described in which the multi-mode fiber 50 and the few-mode fiber 10 are three-mode fibers (2LP mode fibers) that perform mode multiplex transmission in three propagation modes. The LPFG of the few-mode fiber 10 couples an LP01 mode and an LP11 mode.

In the present embodiment, it is assumed that the cavity 15 is formed on the x-axis of d1=4 μm from the center of the core region 11. It is assumed that the position of the cavity 15 is the center position of the cavity. It is assumed that the few-mode fiber 10 is a step index type, the radius of the core region 11 is 7 μm, and the relative refractive index difference between the core region 11 and a cladding region 12 is 0.4%. It is assumed that the diameter of the cavity 15 is 2 μm.

FIG. 4 is a table for describing the mode conversion rate in the case where one cavity 15 is provided on the x-axis as shown in FIG. 2(A). Approximately 4.5% of LP01 mode is coupled to 11b mode for both x-polarization and y-polarization (see bold numbers in FIG. 4). That is, LP01 mode can be coupled to LP11b mode by setting the cavity 15 at a position shifted on the x-axis from the center of the core region 11. Similarly, LP01 mode can be coupled to LP11a mode by setting the cavity 15 at a position shifted on the y-axis from the center of the core region 11.

Therefore, by connecting in series the cavity row 25-1 in which the cavities 15 are periodically arranged on the x-axis in the core region 11 and the cavity row 25-2 in which the cavities 15 are periodically arranged on the y-axis, mode conversion that does not depend on the degeneration mode can be performed.

Embodiment 4

In the present embodiment, the distance dependence of the cavity 15 from the center of the core region 11 and the diameter dependence of the cavity 15 will be described with respect to the mode conversion rate.

Figure 5:
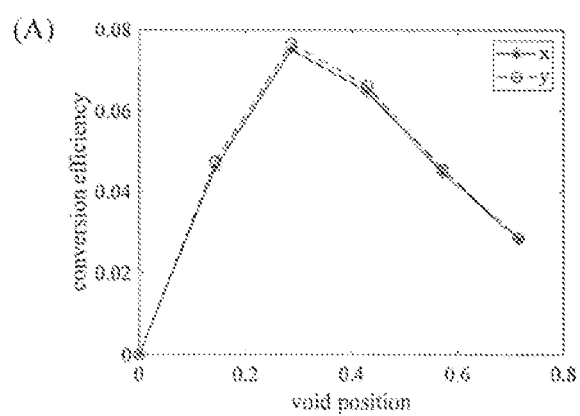
FIG. 5 is a diagram illustrating an effect of the LPFG according to the present invention.
Figure 5:
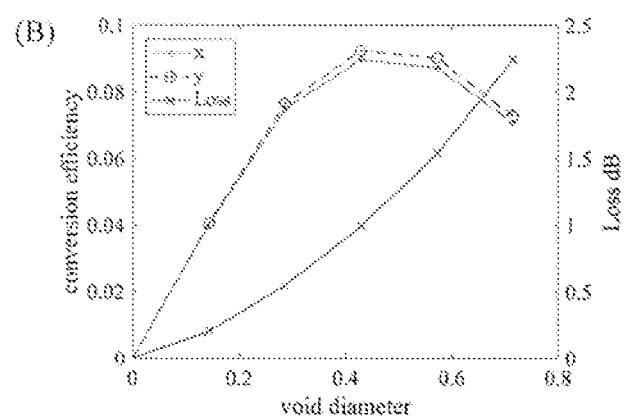

FIG. 5(A) is a diagram showing a conversion rate from LP01 mode to LP11a mode when a distance d1 of the cavity 15 from the center of the core region 11 is changed. It is assumed that the position of the cavity 15 is the center position of the cavity. The diameter of the cavity 15 is 2 μm. The vertical axis represents a mode conversion rate, and the horizontal axis represents a value obtained by normalizing the distance d1 by the radius of the core region 11.

When the cavity 15 is in the center (horizontal axis is zero), no mode conversion is performed. The maximum mode conversion efficiency was shown when the cavity 15 was shifted approximately 2 μm from the center. On the other hand, when the cavity 15 is further separated from the center and brought close to the cladding region 12, the mode conversion efficiency is lowered. That is, when LP01 mode and LP11 mode are coupled, the cavity 15 is located at a position of 0.2 or more and 0.4 or less, preferably 0.29, as a ratio to the radius of the core region 11 at the distance d1 from the center of the core.

FIG. 5(B) is a diagram showing a conversion rate from LP01 mode to LP11a mode when a diameter of the cavity 15 is changed. Here, the distance d1 from the center of the cavity 15 is 2 μm. It is assumed that the position of the cavity 15 is the center position of the cavity. The first vertical axis represents a mode conversion rate, the second vertical axis represents a loss due to the cavity 15, and the horizontal axis represents a value obtained by normalizing the diameter of the cavity 15 by the radius of the core region 11.

When the diameter of the cavity 15 is zero (no cavity), the mode conversion is not performed. The maximum mode conversion efficiency was shown when the diameter of the cavity 15 was approximately 3 μm. On the other hand, when the diameter of the cavity 15 is further increased from there, the loss exceeds 1 dB and the conversion efficiency is lowered. That is, when LP01 mode and LP11 mode are coupled, the diameter of the cavity 15 is 0.3 or more and 0.55 or less, preferably 0.43 or less, which causes a loss of 1 dB or less, as a ratio to the radius of the core region 11.

[Appendix]

An object of the present invention is to provide an LPFG capable of reducing dependence of a mode conversion amount on a polarization state or an electric field distribution of a propagation mode.

Specifically, the LPFG is a long period fiber grating that is formed on a few-mode fiber (FMF) capable of propagating a plurality of n (n is an integer of 2 or more) propagation modes and can couple the plurality of propagation modes, the LPFG including:

a first cavity row in which a plurality of n cavities formed offset in an x-axis direction from a center of a cross section are arranged at equal intervals (A) along a z-axis; and a second cavity row in which a plurality of m cavities formed offset in a y-axis direction from the center of the cross section are arranged at equal intervals (A) along the z-axis.

Here, the definitions of the x/y/z axes are as follows.

x-axis: An axis that penetrates the center of the cross section and is parallel to the cross section y-axis: An axis that penetrates the center of the cross section, is parallel to the cross section, and is orthogonal to the first axis z-axis: An axis that penetrates the center of the cross section and is parallel to the waveguide direction of light in the LPFG

REFERENCE SIGNS LIST

10 Few-mode fiber
11 Core region
12 Cladding region
15 Cavity
25-1, 25-2 Cavity row
30 Modal multiplexer
40 Modal demultiplexer
50 Multi-mode fiber
60 Connecting portion
301 Optical transmission system

The invention claimed is:

1. A long period fiber grating formed on a few-mode fiber capable of propagating n (n is an integer of 2 or more) propagation modes, the long period fiber grating comprising:
cavity rows periodically arranged in a core region of the few-mode fiber at a position away from a central axis of the core region in parallel with the central axis,
wherein a plurality of the cavity rows are provided,
each of the cavity rows is located at a different position in a longitudinal direction of the few-mode fiber, and
the cavity rows are located at positions shifted by 90° from each other on a cross section of the core region with a center of the cross section of the core region as an origin.

2. The long period fiber grating according to claim 1, wherein the cavity rows have the same cavity interval and the same number of cavities.

3. The long period fiber grating according to claim 1,
wherein the number of the propagation modes of the few-mode fiber is 3,
the cavity row is located at a position where a ratio to a radius of the core region is 0.2 or more and 0.4 or less on the cross section with the center of the cross section of the core region as the origin, and
a diameter of each cavity constituting the cavity row has a ratio of 0.3 or more and 0.43 or less with respect to the radius of the core region.

4. An optical transmission system, comprising:
a multi-mode fiber capable of propagating n (n is an integer of 2 or more) propagation modes; and the few-mode fiber that is connected to the multi-mode fiber and is formed with the long period fiber grating according to claim 1.

\* \* \* \* \*